Oct. 11, 1955 F. B. LLEWELLYN 2,720,627

IMPEDANCE MATCHING NETWORKS

Filed Aug. 11, 1951

INVENTOR
F. B. LLEWELLYN
BY H. A. Burgess
ATTORNEY

United States Patent Office 2,720,627

Patented Oct. 11, 1955

2,720,627

IMPEDANCE MATCHING NETWORKS

Frederick B. Llewellyn, Summit, N. J., assignor to Bell Telephone Laboratories, Incorporated, New York, N. Y., a corporation of New York Application August 11, 1951, Serial No. 241,478

8 Claims. (Cl. 333—32)

Figure 1:
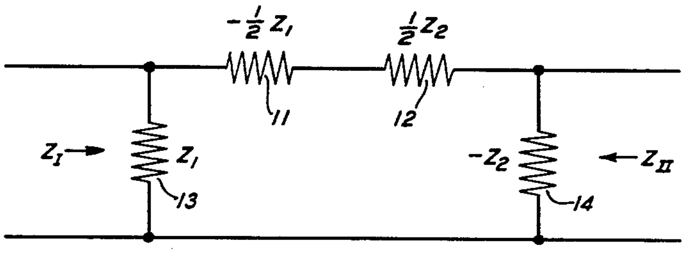

This invention relates generally to impedance matching devices and more particularly, although not exclusively, to devices for adjusting the image impedances presented at the ends of bilateral electrical signal transmission systems.

The principal object of the invention is to provide simple network configurations that will present any desired pair of image impedances at their respective terminals.

Another object is to provide impedance matching devices in which the loss can be minimized or even converted into a gain.

In its principal aspect, the present invention comprises a four-terminal impedance matching network having the equivalent of two series elements and two shunt elements. The impedance of each series element is substantially equal to one-half the negative of the impedance of the corresponding shunt element, and the impedance of each shunt element is integrally related to one of the respective image impedances which the network is required to produce.

One embodiment of the invention comprises a $\pi$ network in which the impedance of one shunt element is substantially equal to one of the image impedances and the impedance of the other shunt element is substantially equal to the negative of the other of the image impedances. Another embodiment comprises a T network in which the impedances of the series elements are determined in the same way as are those of the shunt elements of the $\pi$ network.

Figure 2:
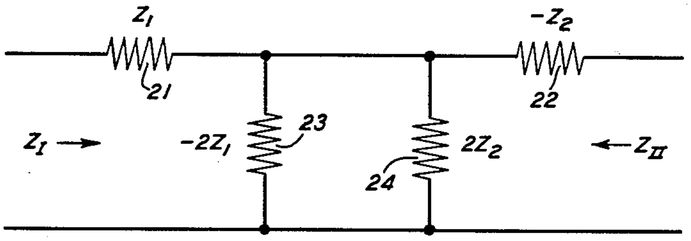

A more complete understanding of the invention may be attained from a study of the following detailed description of two specific embodiments. In the drawings:

Fig. 1 shows a $\pi$ type impedance matching network embodying the present invention; and Fig. 2 illustrates a T type impedance matching network which also embodies the invention.

The $\pi$ network in Fig. 1 comprises two series elements 11 and 12 and two shunt elements 13 and 14, elements 11 and 12 being connected in series to form the series arm of the network. Elements 11 and 12 may, of course, comprise a single series element the impedance of which is equal to the algebraic sum of the impedances of elements 11 and 12. The image impedance presented by the left-hand terminals of the network is represented by $Z_I$, while that presented by the right-hand terminals is represented by $Z_{II}$. The impedance of element 11 is ½ $Z_1$, that of element 12 is ½ $Z_2$, that of element 13 is $Z_1$ and that of element 14 is $-Z_2$. Thus, the impedance of series element 11 is equal to one-half the negative of that of shunt element 13, while the impedance of series element 12 is equal to one-half the negative of that of shunt element 14. The impedance of a single series element equivalent to elements 11 and 12 is ½ $(Z_2-Z_1)$. The propagation factor of the network in either direction is represented by $\theta$.

From the left-hand end of the network of Fig. 1, the following values of short and open-circuit impedances appear:

$$Z \text{ short}=Z_1\left(\frac{Z_2-Z_1}{Z_2+Z_1}\right) \quad (1)$$

$$Z \text{ open}=Z_1\left(\frac{Z_2+Z_1}{Z_2-Z_1}\right) \quad (2)$$

Then:

$$Z_I=\sqrt{Z \text{ open } Z \text{ short}} \quad (3)$$

$$Z_I=Z_1 \quad (4)$$

From the right-hand end:

$$Z \text{ short}=Z_2\left(\frac{Z_2-Z_1}{Z_2+Z_1}\right) \quad (5)$$

$$Z \text{ open}=Z_2\left(\frac{Z_2+Z_1}{Z_2-Z_1}\right) \quad (6)$$

Then:

$$Z_{II}=\sqrt{Z \text{ open } Z \text{ short}} \quad (7)$$

$$Z_{II}=Z_2 \quad (8)$$

In calculating the loss of the network from either end, use is made of the relation $$\tanh \theta=\frac{\sqrt{Z \text{ short}}}{Z \text{ open}} \quad (9)$$

$$\tanh \theta=\frac{Z_2-Z_1}{Z_2+Z_1} \quad (10)$$

The loss is then $$\text{loss}=\frac{\text{“power” out}}{\text{“power” in}} \quad (11)$$

$$\text{loss}=\frac{1+\tanh \theta}{1-\tanh \theta} \quad (12)$$

$$\text{loss}=\frac{Z_2}{Z_1}=\frac{Z_{II}}{Z_I} \quad (13)$$

In decibels, $$\text{loss}=10 \log_{10}\left|\frac{Z_{II}}{Z_I}\right| \quad (14)$$

The embodiment of the invention shown in Fig. 2 is a T network comprising two series elements 21 and 22 and two shunt elements 23 and 24. Elements 23 and 24 are connected in parallel to form the shunt arm of the network, although they may, of course, comprise a single equivalent shunt element. As in Fig. 1, the image impedance presented by the left-hand terminals of the network is represented by $Z_I$, while that presented by the right-hand terminals is $Z_{II}$. In Fig. 2, however, the impedance of element 21 is $Z_1$, that of element 22 is $-Z_2$, that of element 23 is $-2Z_1$, and that of element 24 is $2Z_2$. Thus, the impedance of shunt element 23 is equal to twice the negative of that of series element 21, while the impedance of shunt element 24 is equal to twice the negative of that of series element 22. The impedance of a single shunt element equivalent to elements 23 and 24 is $$\frac{2Z_1Z_2}{Z_1-Z_2}$$

As before, the propagation factor of the network in either direction is represented by $\theta$.

From the left-hand end of the network of Fig. 2, the following values of short and open-circuit impedances appear:

$$Z \text{ short}=Z_1\left(\frac{Z_1-Z_2}{Z_1+Z_2}\right) \quad (15)$$

$$Z \text{ open}=Z_1\left(\frac{Z_1+Z_2}{Z_1-Z_2}\right) \quad (16)$$

Then:

$$Z_I=\sqrt{Z\text{ open }Z\text{ short}} \quad (17)$$

$$Z_I=Z_1 \quad (18)$$

From the right-hand end:

$$Z\text{ short}=Z_2\left(\frac{Z_1-Z_2}{Z_1+Z_2}\right) \quad (19)$$

$$Z\text{ open}=Z_2\left(\frac{Z_1+Y_2}{Z_1-Z_2}\right) \quad (20)$$

Then:

$$Z_{II}=\sqrt{Z\text{ open }Z\text{ short}} \quad (21)$$

$$Z_{II}=Z_2 \quad (22)$$

In determining the loss of the network from either end, use is made of the relation $$\tanh\theta=\frac{\sqrt{Z\text{ short}}}{Z\text{ open}} \quad (23)$$

$$\tanh\theta=\frac{Z_1-Z_2}{Z_1+Z_2} \quad (24)$$

The loss is then $$\text{loss}=\frac{\text{"power" out}}{\text{"power" in}} \quad (25)$$

$$\text{loss}=\frac{1+\tanh\theta}{1-\tanh\theta} \quad (26)$$

$$\text{loss}=\frac{Z_1}{Z_2}=\frac{Z_I}{Z_{II}} \quad (27)$$

In decibels, $$\text{loss}=10\log_{10}\left|\frac{Z_I}{Z_{II}}\right| \quad (28)$$

Networks embodying the present invention contain negative impedances, but methods of obtaining these are now well known. Some of the better ones are those in which the negative impedance is produced from a passive impedance by a converter having a conversion factor of the type $(1-\mu)/(1+\mu)$ or $(1+\mu)/(1-\mu)$, where $\mu$ is a factor determined by the components of the particular circuit used. In either case, the negative impedance is independent of the converter when $\mu$ is sufficiently large. A converter of this type is disclosed in the article by J. L. Merrill, entitled "Theory of the Negative Impedance Converter," appearing on page 88 of the January 1951 issue of The Bell System Technical Journal, and forms the basis for application Serial No. 191,670, filed October 23, 1950, by J. L. Merrill.

Networks embodying the present invention have the desirable property of being able to match any two given impedances on an image basis. Thus, a network embodying the invention may be employed as a transducer connected between two other transducers of differing image impedances. When so connected, the combination of all three transducers is matched on an image impedance basis. In another aspect of the same type of use, networks embodying the invention may be added to a transmission system in order that the image impedance of the composite structure shall take on a predetermined desired value. Thus, in repeatered transmission systems of the variety disclosed in applicant's copending application Serial No. 217,941, filed March 28, 1951, they may be used at the respective ends of the systems to transform the over-all image impedances to substantially pure resistances.

Moreover, structures embodying the present invention are not passive, and consequently the loss is not restricted as it is in the case of passive structures. As indicated by Equations 14 and 28, the loss is, in fact, given by ten times the logarithm of the ratio of the magnitudes of the two image impedances. Since the use of ideal transformers (that is, those having coupling coefficients of substantially unity) permits this ratio to be adjusted at will, the combination of a network embodying the invention with an ideal transformer permits the loss to be reduced to zero or even converted into a gain where that is desirable.

It is to be understood that the above-described arrangements are illustrative of the application of the principles of the invention. Numerous other arrangements may be devised by those skilled in the art without departing from the spirit and scope of the invention.

What is claimed is:

1. A four-terminal impedance matching network having a pair of series elements and a pair of shunt elements in which the impedance of one of said series elements is substantially equal to one half the negative of the impedance of one of said shunt elements, the impedance of the other of said series elements is substantially equal to one half the negative of the impedance of the other of said shunt elements, the impedance of one of said elements of one of said pairs is substantially equal to the image impedance of the network at one end, and the impedance of another of said elements of said one of said pairs is substantially equal to the negative of the image impedance of the network at the other end.

2. A four-terminal impedance matching network in accordance with claim 1 in which the impedance of one of said series elements is positive and the impedance of the other of said series elements is negative.

3. A four-terminal impedance matching network in accordance with claim 1 in which the impedance of one of said shunt elements is positive and the impedance of the other of said shunt elements is negative.

4. A $\pi$ type impedance matching network having first and second shunt elements and first and second interposed series elements in which said series elements are in series with each other, the impedance of said first series element is substantially equal to one-half the negative of the impedance of said first shunt element, the impedance of said second series element is substantially equal to one-half the negative of the impedance of said second shunt element, the impedance of said first shunt element is substantially equal to the image impedance presented by the network at one end, and the impedance of said second shunt element is substantially equal to the negative of the image impedance presented by the network at the other end.

5. A T type impedance matching network having first and second series elements and first and second interposed shunt elements in which said shunt elements are in parallel with each other, the impedance of said first shunt element is substantially equal to twice the negative of the impedance of said first series element, the impedance of said second shunt element is substantially equal to twice the negative of the impedance of said second series element, the impedance of said first series element is substantially equal to the image impedance presented by the network at one end, and the impedance of said second series element is substantially equal to the negative of the image impedance presented by the network at the other end.

6. A four-terminal impedance matching network having a pair of series elements and a pair of shunt elements in which the impedance of one of said series elements is substantially equal to one half the negative of the impedance of one of said shunt elements, the impedance of the other of said series elements is substantially equal to one half the negative of the impedance of the other of said shunt elements, the impedance of the first element at one end of the network is substantially equal to the image impedance of the network at the said one end, and the impedance of the first element at the other end of the network is substantially equal to the negative of the image impedance of the network at said other end.

7. A $\pi$ type impedance matching network having first and second shunt elements and an interposed series element in which said first shunt element has an impedance $Z_1$, said second series element has an impedance $-Z_2$, and said series element has an impedance $$\tfrac{1}{2}Z_2-\tfrac{1}{2}Z_1$$

where $Z_1$ is substantially equal to the image impedance presented by the network on the side of said first shunt element and $Z_2$ is substantially equal to the image impedance presented by the network on the side of said second shunt element.

8. A T type impedance matching network having first and second series elements and an interposed shunt element in which said first series element has an impedance $Z_1$, said second series element has an impedance $-Z_2$, and said shunt element has an impedance $$\frac{-2Z_1Z_2}{Z_2-Z_1}$$

where $Z_1$ is substantially equal to the image impedance presented by the network on the side of said first series element and $Z_2$ is substantially equal to the image impedance presented by the network on the side of said second series element.

References Cited in the file of this patent

UNITED STATES PATENTS

| | | |
|---|---|---|
| 1,628,983 | Johnson | May 17, 1927 |
| 1,701,552 | Zobel | Feb. 12, 1929 |
| 2,048,737 | Farnham | July 28, 1936 |
| 2,204,712 | Wheeler | June 18, 1940 |
| 2,270,644 | Blackman | Jan. 20, 1942 |
| 2,273,519 | Haantjes | Feb. 17, 1942 |
| 2,395,165 | Collard | Feb. 19, 1946 |